(12) United States Patent
Labour et al.

(10) Patent No.: US 10,026,147 B1
(45) Date of Patent: Jul. 17, 2018

(54) GRAPHICS SCENEGRAPH RENDERING FOR WEB APPLICATIONS USING NATIVE CODE MODULES

(71) Applicant: Google LLC, Mountain View, CA (US)

(72) Inventors: Antoine Labour, Mountain View, CA (US); Matthew Papakipos, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/813,025

(22) Filed: Nov. 14, 2017

Related U.S. Application Data

(63) Continuation of application No. 15/460,168, filed on Mar. 15, 2017, now Pat. No. 9,824,418, which is a continuation of application No. 14/449,754, filed on Aug. 1, 2014, now Pat. No. 9,619,858, which is a continuation of application No. 12/497,456, filed on Jul. 2, 2009, now Pat. No. 8,797,337.

(51) Int. Cl.
  *G06T 1/20* (2006.01)
  *G06T 1/60* (2006.01)

(52) U.S. Cl.
  CPC . *G06T 1/20* (2013.01); *G06T 1/60* (2013.01)

(58) Field of Classification Search
  None
  See application file for complete search history.

(56) References Cited

U.S. PATENT DOCUMENTS

| | | | |
|---|---|---|---|
| 5,283,899 A | 2/1994 | Cook et al. | |
| 5,764,889 A | 6/1998 | Ault et al. | |
| 5,768,503 A | 6/1998 | Olkin | |
| 5,974,549 A | 10/1999 | Golan | |
| 6,128,774 A | 10/2000 | Necula et al. | |
| 6,275,938 B1 | 8/2001 | Bond et al. | |
| 6,393,538 B2 | 5/2002 | Murayama | |

(Continued)

FOREIGN PATENT DOCUMENTS

| | | |
|---|---|---|
| CN | 101067827 A | 11/2007 |
| EP | 1681656 A1 | 7/2006 |

(Continued)

OTHER PUBLICATIONS

Apap et al.,"Detecting Malicious Software by Monitoring Anomalous Windows Registry Access", Recent advances in intrusion detection, Springer, 2002, pp. 36-53.

(Continued)

*Primary Examiner* — James A Thompson
(74) *Attorney, Agent, or Firm* — McDermott Will & Emery LLP

(57) ABSTRACT

A native code module is executed in a secure runtime environment that prevents the first code module from accessing a graphics rendering interface outside of the secure runtime environment. Rendering commands are generated using the native code module based on a scene representation, and transmitted from the native code module within the secure runtime environment to a trusted code module outside the secure runtime environment. The trusted code module is configured to communicate with the graphics rendering interface to provide graphics acceleration, and a rendered image is rendered using the trusted second code module and graphics hardware based on execution of the rendering commands outside the secure runtime environment.

20 Claims, 5 Drawing Sheets

(56) References Cited

U.S. PATENT DOCUMENTS

| | | |
|---|---|---|
| 6,507,904 B1 | 1/2003 | Ellison et al. |
| 6,546,546 B1 | 4/2003 | Van Doorn |
| 6,675,230 B1 | 1/2004 | Lewallen |
| 6,738,469 B1 | 5/2004 | Peirce et al. |
| 6,801,224 B1 | 10/2004 | Lewallen |
| 6,931,544 B1 | 8/2005 | Kienhofer et al. |
| 7,069,562 B2 | 6/2006 | Kushnirskiy et al. |
| 7,085,990 B2 | 8/2006 | Freissmann |
| 7,188,282 B2 | 3/2007 | Walmsley |
| 7,269,833 B2 | 9/2007 | Kushnirskiy |
| 7,577,992 B2 | 8/2009 | Abadi et al. |
| 7,581,103 B2 | 8/2009 | Home et al. |
| 7,620,941 B1 | 11/2009 | Leventhal |
| 7,660,786 B2 | 2/2010 | Wang et al. |
| 7,984,511 B2 | 7/2011 | Kocher et al. |
| 8,151,349 B1 | 4/2012 | Yee et al. |
| 8,352,967 B2 | 1/2013 | Labour et al. |
| 8,368,705 B2 | 2/2013 | Green et al. |
| 8,424,082 B2 | 4/2013 | Chen et al. |
| 8,675,000 B2 | 3/2014 | Labour |
| 8,797,337 B1 | 8/2014 | Labour et al. |
| 9,058,483 B2 | 6/2015 | Chen et al. |
| 9,619,858 B1 | 4/2017 | Labour et al. |
| 2002/0095522 A1 | 7/2002 | Hayko et al. |
| 2003/0005048 A1 | 1/2003 | Risalvato |
| 2003/0079052 A1 | 4/2003 | Kushnirskiy |
| 2003/0126311 A1 | 7/2003 | Kushnirskiy et al. |
| 2003/0140179 A1 | 7/2003 | Wilt et al. |
| 2004/0111627 A1 | 6/2004 | Evans et al. |
| 2004/0123117 A1 | 6/2004 | Berger |
| 2004/0133777 A1 | 7/2004 | Kiriansky et al. |
| 2005/0246761 A1 | 11/2005 | Ross et al. |
| 2005/0283770 A1 | 12/2005 | Karp et al. |
| 2005/0289264 A1 | 12/2005 | Illowsky et al. |
| 2006/0021029 A1 | 1/2006 | Brickell et al. |
| 2006/0114260 A1 | 6/2006 | Diard |
| 2006/0174077 A1 | 8/2006 | Abadi et al. |
| 2006/0230011 A1 | 10/2006 | Tuttle et al. |
| 2007/0061535 A1 | 3/2007 | Xu et al. |
| 2007/0101435 A1 | 5/2007 | Konanka et al. |
| 2007/0107057 A1 | 5/2007 | Chander et al. |
| 2007/0150081 A1 | 6/2007 | Nixon et al. |
| 2007/0236499 A1 | 10/2007 | Mihara et al. |
| 2007/0244990 A1 | 10/2007 | Wells |
| 2007/0261124 A1 | 11/2007 | Centonze et al. |
| 2007/0283324 A1 | 12/2007 | Geisinger |
| 2008/0036763 A1 | 2/2008 | Chen et al. |
| 2008/0042923 A1 | 2/2008 | De Laet |
| 2008/0083030 A1 | 4/2008 | Durham et al. |
| 2008/0104195 A1 | 5/2008 | Hawkins et al. |
| 2008/0139301 A1 | 6/2008 | Holthe |
| 2008/0144903 A1 | 6/2008 | Wang et al. |
| 2008/0244265 A1 | 10/2008 | Bookman et al. |
| 2009/0002380 A1 | 1/2009 | Langyel et al. |
| 2009/0007223 A1 | 1/2009 | Centonze et al. |
| 2009/0119578 A1 | 5/2009 | Relyea et al. |
| 2009/0122062 A1 | 5/2009 | Kilpatrick |
| 2009/0222925 A1 | 9/2009 | Hilaiel et al. |
| 2009/0282474 A1 | 11/2009 | Chen et al. |
| 2009/0282477 A1 | 11/2009 | Chen et al. |
| 2010/0013842 A1 | 1/2010 | Green et al. |
| 2010/0017461 A1 | 1/2010 | Kokkevis et al. |
| 2010/0118038 A1 | 5/2010 | Labour et al. |
| 2010/0118039 A1 | 5/2010 | Labour |
| 2010/0138755 A1 | 6/2010 | Kulkarni et al. |
| 2012/0198533 A1 | 8/2012 | Thomas et al. |
| 2013/0033508 A1 | 2/2013 | Labour et al. |

FOREIGN PATENT DOCUMENTS

| | | |
|---|---|---|
| EP | 1921584 A2 | 5/2008 |
| JP | 2002-108600 A | 4/2002 |
| JP | 2008-123519 A | 5/2008 |
| WO | WO-99/10795 A1 | 3/1999 |
| WO | WO-01/80098 A2 | 10/2001 |
| WO | WO-2006/114898 A1 | 11/2006 |
| WO | WO-2008/040123 A1 | 4/2008 |

OTHER PUBLICATIONS

Appel, "Foundational proof-carrying code," 10 pages, 16th Annual IEEE Symposium on Logic in xomputer science; 2001.

Chang et al. "User-level resource-constrained sandboxing." Proceedings of the 4.sup.th Usenix Windows Systems Symposium. Jan. 1, 2000. Usenix Association. Berkeley, CA, USA. pp. 25-35.

Erlingsson et al., "XFI: Software guards for system address spaces." in ODSI '06: 7th Symposium on Operating Systems Design and Implementation, pp. 75-88, Nov. 2006.

Ford, "VXA: A virtual architecture for durable compressed archives." in USENIX File and Storage Technologies, pp. 1-14, Dec. 2005.

McCamant et al., "Evaluating SFI for a CISC architecture." In 15th USENIX Security Symposium, pp. 1-16, Aug. 2006.

Necula, G., "Proof carrying code." In Principles of Programming Languages, pp. 1-14, 1997.

Necula, "Proof-Carrying Code," Proceedings of the 24.sup.th Annual ACP SIGPLAN-SIGACT Symposium on Principles of Programming Languages (POPL '97), Paris, France, Jan. 15-17, 1997. 14 pages.

Necula, "Proof carrying code," School of Computer Science, Carnegie Mellon University, Nov. 1996, 62 pages.

Prasad et al., "Locating system problems using dynamic instrumentation." In 2005 Ottawa Linux Symposium, pp. 49-64, Jul. 2005.

Stegmaier et al., "A Generic Solution for Hardware-Accelerated Remote Visualization", pp. 1-9, IEEE TCVG Symposium on Visualization, 2002.

Wahbe et al., "Efficient software-based fault isolation," ACM SIGOPS Operating Systems Review, 27(5):203-216, Dec. 1993.

Webber et al., "A toolkit for detecting and analyzing malicious software", Proceedings on 18th Annual Computer Security Applications Conference, Dec. 9-13, 2002, pp. 423-431.

Yee et al. "Native Client: A Sandbox for Portable, Untrusted x86 Native Code." 2009 30.sup.th IEEE Symposium on Security and Privacy. May 17, 2009. IEEE. Piscataway, NJ, USA. pp. 79-93.

GRAPHICS SCENEGRAPH RENDERING FOR WEB APPLICATIONS USING NATIVE CODE MODULES

RELATED APPLICATION

The present application claims the benefit of priority under 35 U.S.C. § 120 as a continuation of U.S. patent application Ser. No. 15/460,168 filed on Mar. 15, 2017, which claims the benefit of priority under 35 U.S.C. § 120 as a continuation of U.S. patent application Ser. No. 14/449,754 filed on Aug. 1, 2014, now U.S. Pat. No. 9,619,858, which is a continuation of U.S. application Ser. No. 12/497,456, filed on Jul. 2, 2009, now U.S. Pat. No. 8,797,337, each of the above applications being hereby expressly incorporated herein by reference in their entirety.

BACKGROUND

Field

The present embodiments relate to techniques for executing web applications. More specifically, the present embodiments relate to a method and system for providing graphics scenegraph rendering to the web applications using native code modules.

Related Art

Computer systems often include a number of native applications that require complex three-dimensional (3D) scenes to be rendered, such as computer games and computer-aided design (CAD) systems. To render 3D scenes, these native applications may use graphics application programming interfaces (APIs) that direct calculations related to graphics rendering to dedicated graphics processing units (GPUs). The additional computational power provided by these GPUs can greatly improve graphics quality and throughput.

Web applications, which have become more prevalent in recent years, are typically written in scripting languages that are unable to utilize low-level graphics APIs that provide graphics hardware acceleration. Instead, graphics rendering for web applications is typically performed by CPUs instead of GPUs. The software-based nature of web-based graphics rendering may thus limit the graphics capabilities of web applications. However, unlike native applications, web applications provide a number of advantages. For example, web applications are capable of executing on multiple platforms, do not require installation, and can be more secure than native applications.

The tradeoff between web application security and native graphics performance may be addressed using a browser plugin that renders graphics for web applications by interfacing with a local graphics hardware device (e.g., a GPU). Such a plugin may correspond to a complex software system that includes various mechanisms for obtaining scene information from the web applications; storing the scene information; processing the scene information using transforms, effects, and shaders; and sending commands to the graphics hardware for rendering the scene. The processing demands of the plugin may additionally require the plugin to be implemented using native code, which is traditionally insecure. Moreover, plugin installation traditionally requires that the browser be restarted, which may lead to a poor user experience. Consequently, the plugin itself may include a number of potential security vulnerabilities that may be exploited by other applications and/or bugs that may lead to system failures.

Hence, what is needed is a mechanism for safely executing native code for web-based graphics rendering while maintaining communication between the native code and graphics hardware.

SUMMARY

One embodiment provides a system that facilitates the execution of a web application. During operation, the system loads a native code module that includes a scenegraph renderer into a secure runtime environment. Next, the system uses the scenegraph renderer to create a scenegraph from a graphics model associated with the web application and generates a set of rendering commands from the scenegraph. The system then writes the rendering commands to a command buffer and reads the rendering commands from the command buffer. Finally, the system uses the rendering commands to render, for the web application, an image corresponding to the graphics model by executing the rendering commands using a graphics-processing unit (GPU).

In some embodiments, the system also validates the native code module prior to loading the native code module into the secure runtime environment.

In some embodiments, the system also displays the image within the web browser.

In some embodiments, the system also uses the scenegraph renderer to write buffer data associated with the rendering commands to a shared memory buffer and uses the buffer data to render the image by reading the buffer data from the shared memory buffer.

In some embodiments, the shared memory buffer and the command buffer are implemented using an inter-module communication (IMC) buffer.

In some embodiments, the rendering commands are further executed using at least one of a trusted code module and a rendering engine.

In some embodiments, the graphics model is obtained from at least one of the web application, the native code module, and a separate native code module.

In some embodiments, executing the rendering commands involves:
  (i) storing a subset of the rendering commands associated with a component in the image;
  (ii) updating a set of parameters associated with the stored subset of the rendering commands; and
  (iii) using the stored subset of the rendering commands and the updated parameters to render the component in the image.

DETAILED DESCRIPTION

Figure 1:
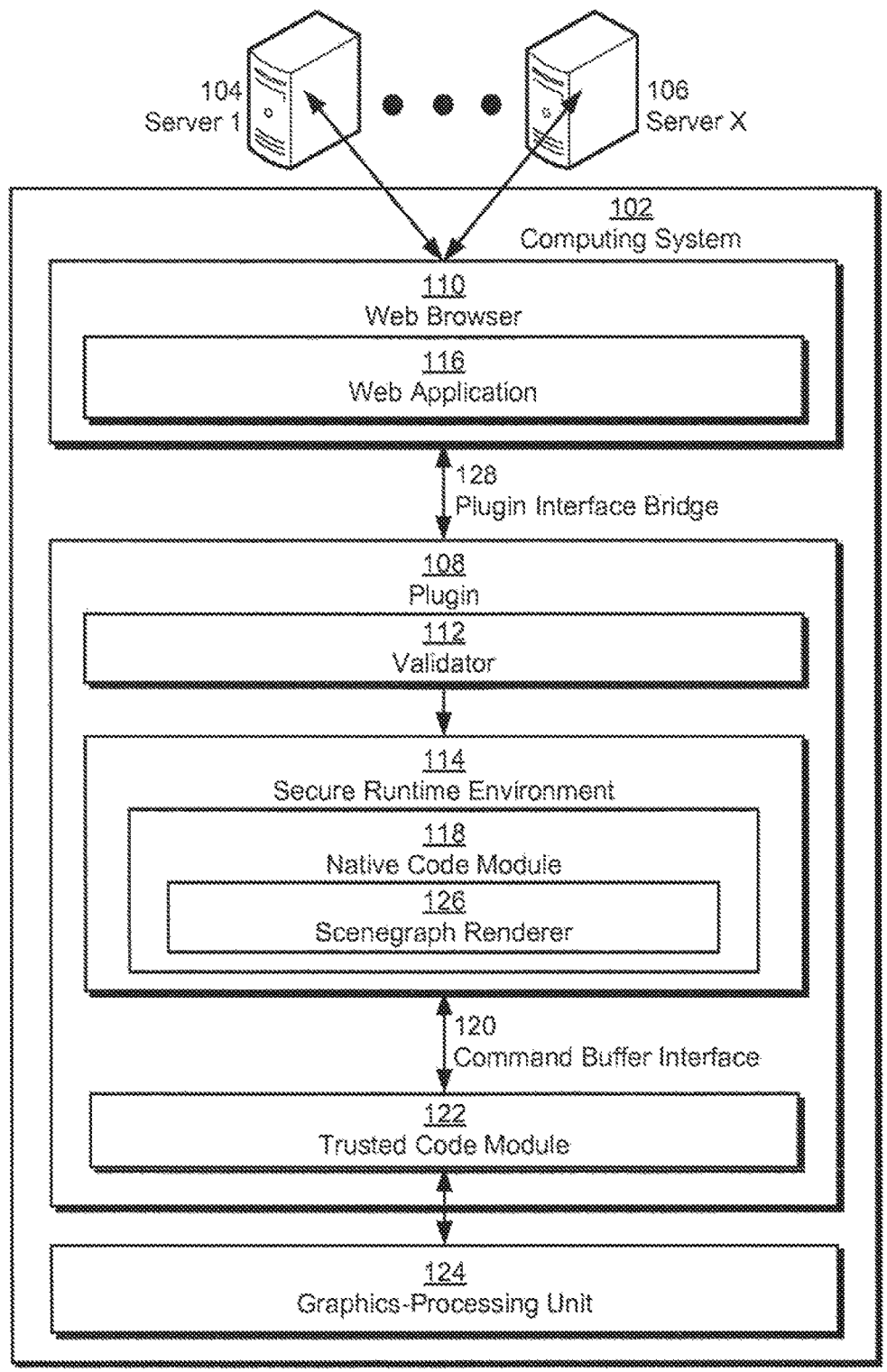
FIG. 1 shows a schematic of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating the execution of a web application. The web application may be loaded in a web browser and executed on a computing system such as a personal computer (PC), a mobile phone, a personal digital assistant (PDA), a graphing calculator, a portable media player, a global positioning system (GPS) receiver, and/or another electronic computing device. The web application may be obtained by the computing system from a server using a network connection with the server. For example, the web application may be downloaded over the Internet from a website.

More specifically, embodiments provide a method and system for rendering graphics for the web application. A native code module associated with the web application may be executed within a secure runtime environment within a plugin associated with the web browser. To render graphics for the web application, the native code module may issue rendering commands to a trusted code module provided by the plugin using a command buffer interface.

In addition, the native code module may provide a scenegraph renderer for the web application. The scenegraph renderer can include any type of software component (or any combination of hardware and software components) which provides functionality that enables a retained-mode graphics for the web application by creating a scenegraph from a graphics model associated with the web application. For example, the graphics model may include a set of shapes composed of triangles or polygons, one or more light sources, a camera, and/or one or more rendering effects (e.g., shaders, culling, blending, etc.). The resulting scenegraph may include any type of graph or tree data structure that is used the represent a graphics scene.

A scenegraph is a data structure, such as a tree or a more-general interconnected graph, which is used to organize data associated with a graphical scene into a logical or spatial hierarchy comprising interconnected nodes, wherein each node can specify an object or a transformation (such as a rotation) for an object. A node in scenegraph can have many child nodes, but typically only one parent node. Moreover, an operation applied to a parent node propagates to associated child nodes, and possibly to other descendent nodes. Scene graphs can also be structured to group related objects into a compound object which can be manipulated and transformed as a single object.

The scenegraph renderer described above is also configured to generate a set of rendering commands from the scenegraph and to write the rendering commands to a command buffer provided by the command buffer interface. The trusted code module may then render an image corresponding to the graphics model by executing the rendering commands using a graphics-processing unit (GPU).

The native code module may additionally store rendering commands associated with components in the image for future issuance of the rendering commands with updated parameters. For example, the native code module may issue rendering commands to animate a model across frames of the image by writing the same rendering commands for the model to the command buffer using updated parameters for each frame of the animation. Consequently, embodiments may provide secure hardware-accelerated graphics rendering and animation to web applications while requiring relatively few method calls from the web applications.

FIG. 1 shows a schematic of an embodiment of a system. The system includes a computing system 102 and a set of servers (e.g., server 1 104, server x 106). Computing system 102 includes a web application 116 running within a web browser 110 and a plugin 108. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, graphics-processing unit (GPU) 124, etc.) on computing system 102 from the operating system, as well as interact with the user through a hardware and/or software framework provided by the operating system, as described below.

Those skilled in the art will appreciate that computing system 102 may include functionality to execute both native applications and non-native applications. In other words, computing system 102 may include native applications, such as web browser 110, that are locally installed on computing system 102 and specific to the operating system and/or one or more hardware devices on computing system 102. Such applications may be compiled into native (e.g., machine) code that executes directly on one or more central processing units (CPUs) of computing system 102. Code execution for such applications may further be optimized by writing the applications in a combination of general-purpose programming languages (e.g., C, C++, etc.) and assembly language, as well as utilizing libraries that provide hardware acceleration (e.g., graphics hardware acceleration) to the applications. However, the installation of native applications may compromise the security of computing system 102 and private data stored on computing system 102.

Computing system 102 may also include functionality to execute platform-independent, non-native applications. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, etc.) associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

In particular, web application 116 may be unable to utilize graphics hardware acceleration (e.g., from GPU 124) in graphics rendering. For example, web application 116 may be written in a language (e.g., Javascript) that lacks an interface with GPU 124 and/or that is too slow to issue rendering commands at a rate that fully utilizes the hardware acceleration provided by GPU 124. Instead, graphics rendering for web application 116 may be performed using software that executes on a CPU of computing system 102 rather than GPU 124. As a result, graphics in web application 116 may be suboptimal compared to graphics in native applications that employ graphics hardware acceleration.

Limitations in graphics rendering for web application 116 may further preclude web application 116 from providing features that utilize significant graphics-processing resources, including graphics hardware acceleration. For example, web application 116 may be unable to efficiently render and animate a complex three-dimensional (3D) model for a web-based computer game.

To enable graphics support and graphics hardware acceleration for web applications, operations related to graphics processing may be offloaded to a plugin 108 in computing system 102. Plugin 108 may expose the capabilities of GPU 124 to web application 116, thus allowing web application 116 to utilize graphics hardware acceleration, including the application of vertex and pixel shaders. Plugin-based graphics hardware acceleration for web applications is described in a co-pending non-provisional application by inventors Robin Green, Evangelos Kokkevis, Matthew Papakipos and Gregg Tavares and filed 16 Jul. 2008 entitled "Web-Based Graphics Rendering System," having Ser. No. 12/174,586, which is incorporated herein by reference.

As shown in FIG. 1, plugin 108 includes a native code module 118 and a trusted code module 122. The interaction of native code module 118 and trusted code module 122 may allow plugin 108 to provide graphics hardware acceleration for web application 116. Furthermore, the validation of native code module 118 by a validator 112 in plugin 108 and the execution of native code module 118 within a secure runtime environment 114 in plugin 108 may facilitate the safe execution of rendering commands for web application 116 by GPU 124, as discussed in further detail below.

Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference.

Because native code module 118 may include binary code that runs directly on hardware, native code module 118 may be platform independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators.

In other words, native code module 118 may correspond to a software module containing native code that runs directly on hardware provided by computing system 102, such as a CPU. As a result, native code module 118 may be used to perform tasks that require substantial access to CPU resources on computing system 102, including high-level graphics-rendering capabilities, to web application 116. As discussed below, native code module 118 may implement a scenegraph renderer 126 for web application 116. Alternatively, native code module 118 may securely provide a lower-level rendering API such as an OpenGL or Direct3D library within secure runtime environment 114.

Furthermore, some or all of web application 116 may execute within native code module 118. For example, web application 116 may correspond to a 3D computer game that runs within web browser 110. As a result, web application 116 may include one or more native code modules that simulate physics in the computer game and/or one or more native code modules that render real-time 3D graphics in the computer game.

As mentioned previously, native code module 118 may interact with trusted code module 122 to provide graphics hardware acceleration to web application 116. In particular, native code module 118 may receive graphics rendering requests from web application 116 through a scenegraph interface with web application 116. The scenegraph interface may be provided by a plugin interface bridge 128 that implements an inter-process communication (IPC) mechanism, such as a remote procedure call (RPC) mechanism and/or socket mechanism, between native code module 118 and web browser 110.

Plugin interface bridge 128 may allow native code module 118 to operate as a plugin for web browser 110 (e.g., a Netscape Plugin Application Programming Interface (NPAPI) or ActiveX (ActiveX™ is a registered trademark of Microsoft Corp.) plugin) without changes to the plugin architecture used by web browser 110. Plugin interface bridges between web browsers and native code modules are described in a co-pending non-provisional application by Antoine Labour, Matthew Papakipos, Shiko Okasaka, and Jeff Timanns, entitled "Safe Browser Plugins for Native Code Modules," having Ser. No. 12/268,004 and filing date 12 Jun. 2008, which is incorporated herein by reference.

The scenegraph interface may allow native code module 118 and/or scenegraph renderer 126 to obtain and store a graphics model to be rendered for web application 116. The graphics model may include, for example, a set of shapes composed of triangles or polygons, one or more light sources, a camera, and/or one or more rendering effects (e.g., shaders, culling, blending, etc.). Furthermore, the graphics model may be obtained from web application 116 as an input file that describes the graphics model using a scene description language and/or as a set of method calls from web application 116 to native code module 118 through plugin interface bridge 128. Alternatively, the graphics model may be directly stored in native code module 118 (e.g., programmed into native code module 118) and/or obtained from a separate native code module (not shown) in computing system 102 through an inter-module communication (IMC) interface with the separate native code module.

The graphics model may then be stored as a scenegraph by scenegraph renderer 126. In other words, scenegraph renderer 126 may create a logical and/or spatial representation of the graphics model using a graph of shape nodes, transform nodes, and/or other types of nodes. The scenegraph may further allow native code module 118 and/or scenegraph renderer 126 to perform advanced operations on one or more components of the graphics model. For example, scenegraph renderer 126 may perform transformations, scene management, clipping, culling, and/or visibility operations on one or more nodes of the scenegraph. Finally, the scenegraph may enable scenegraph renderer 126 and/or native code module 118 to render an image corresponding to the graphics module using GPU 124.

Those skilled in the art will appreciate that the execution of native code module 118 within secure runtime environment 114 may prevent native code module 118 from accessing hardware devices on computing system 102, such as GPU 124. Instead, native code module 118 may generate a set of rendering commands from the scenegraph and transmit the rendering commands to trusted code module 122 using a command buffer interface 120 with trusted code module 122. In other words, native code module 118 may function as a software client that transforms high-level shape nodes in a retained-mode scenegraph into low-level rendering commands that are executed using an immediate-mode command buffer interface 120 with trusted code module 122. Transformation of nodes in scenegraphs into rendering commands is described in further detail below with respect to FIG. 3.

To communicate with trusted code module 122, native code module may write the rendering commands to a command buffer provided by command buffer interface 120. Native code module 118 may also write buffer data to a shared memory buffer provided by command buffer interface 120. In one or more embodiments, the command and shared memory buffers are implemented using an inter-module communication (IMC) buffer. Transmission of rendering commands and/or buffer data between native code module 118 and trusted code module 122 using IMC buffers is discussed below with respect to FIG. 2.

Trusted code module 122 may operate as a software service that reads the rendering commands from the command buffer and the buffer data from the shared memory buffer. Because trusted code module 122 executes outside secure runtime environment 114, trusted code module 122 may include the capability to communicate with GPU 124. As a result, trusted code module 122 may render images by executing rendering commands from the command buffer using a direct interface with GPU 124 and/or an interface with a rendering engine such as an OpenGL (OpenGL™ is a registered trademark of Silicon Graphics, Inc.) or Direct3D (Direct3D™ is a registered trademark of Microsoft Corp.) renderer. The rendered image may then be displayed within web browser 110 as output for web application 116. Secure web-based graphics rendering with software clients, software services, and command buffer interfaces is described in a co-pending non-provisional application by inventor Antoine Labour and filed on the same day as the instant application, entitled "Command Buffers for Web-Based Graphics Rendering." having serial number TO BE ASSIGNED, and filing date TO BE ASSIGNED, which is incorporated herein by reference.

In one or more embodiments, native code module 118 includes functionality to store rendering commands associated with one or more components in the graphics model and/or image. Native code module 118 may then provide the stored rendering commands to trusted code module 122 by writing the rendering commands to the command buffer without recalculating the values of the rendering commands. The rendering commands may additionally specify a set of parameters associated with the component, such as vertex buffer data, index buffer data, effect data, and/or texture data. As a result, multiple renderings of the component may be performed by writing the stored rendering commands to the command buffer and updating values for the components' parameters using the command buffer and/or shared memory buffer.

The storing of rendering commands may thus improve performance by reducing the amount of processing required by native code module 118 to issue rendering commands to the command buffer. The reduction in processing may further allow web application 116 to provide real-time changes and/or updates to the components' parameters through plugin interface bridge 128. In other words, the combined use of a scenegraph and stored rendering commands by native code module 118 may reduce the number of method calls required between web application 116 and native code module 118 to a point that enables a non-native web application 116 to describe and/or animate a complex 3D graphics model on computing system 102.

For example, a character in a computer game may be associated with two components (e.g., objects). A graphics model for the character may be obtained from web application 116 as an input file and/or as a series of method calls to native code module 118. Native code module 118 may then create a scenegraph from the input file and/or method calls and generate a set of rendering commands from the scenegraph. For example, native code module 118 may generate the following sequence of rendering commands from the scene graph:
Set effect
Set transformation matrices for the first object
Set a vertex buffer for the first object
Draw the first object
Set transformation matrices for the second object
Set a vertex buffer for the second object
Draw the second object To draw the character, native code module 118 may issue the sequence of rendering commands to the command buffer. To animate the character (e.g., during each frame), native code module 118 may write the same rendering commands to the command buffer while changing only the parameters (e.g., transformation matrices) used in the animation. The updated parameters may be written to or stored in the command buffer, shared memory buffer, and/or a different set of buffers (e.g., vertex buffers). In other words, because the inherent structure of the rendering commands is the same, native code module 118 may store the rendering commands for the character and insert the updated parameters into the stored command buffer structure instead of recalculating the rendering commands for each frame of the animation. Furthermore, per-frame changes to the parameters may be provided by web application 116 through plugin interface bridge 128, thus allowing web application 116 to control the animation of the character.

Figure 2:
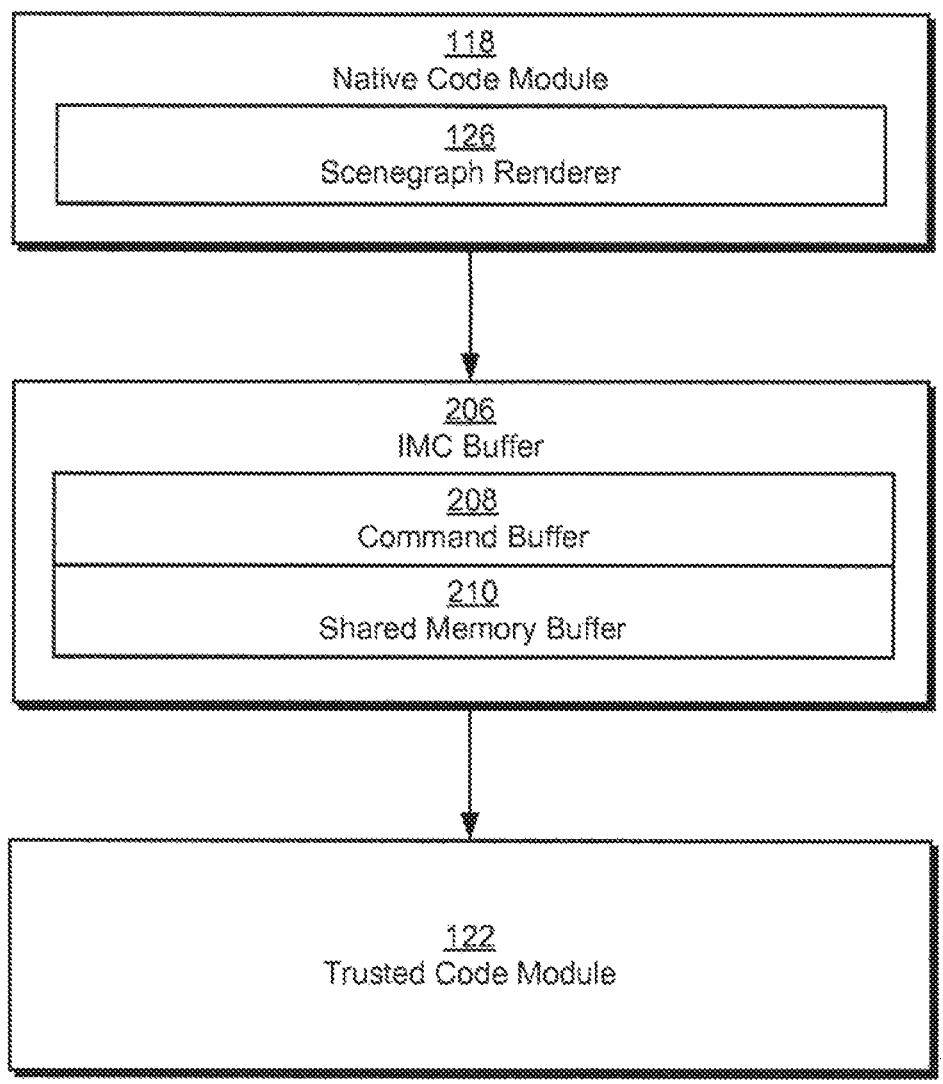
FIG. 2 shows the use of inter-module communication (IMC) buffers to facilitate interaction between a native code module and a trusted code module in accordance with an embodiment of the system.

FIG. 2 shows the use of inter-module communication (IMC) buffers to facilitate interaction between native code module 118 and trusted code module 122 in accordance with an embodiment of the system. As shown in FIG. 2, an IMC buffer 206 is configured to store a command buffer 208 and a shared memory buffer 210 for use by native code module 118 and trusted code module 122. Alternatively, separate IMC buffers may be used to store command buffer 208 and one or more shared memory buffers. IMC buffer 206 may be created by native code module 118 and/or trusted code module 122 during initialization and shared between native code module 118 and trusted code module 122. As a result, both native code module 118 and trusted code module 122 may map IMC buffer 206 to their respective address spaces. Furthermore, both native code module 118 and trusted code module 122 may access IMC buffer 206 through an IMC interface and/or IMC runtime. For example, native code module 118 and/or trusted code module 122 may use the IMC interface and/or IMC runtime to create command buffer 208 and/or shared memory buffer 210 within IMC buffer 206.

In addition, native code module 118 may transmit rendering commands and/or buffer data generated by scenegraph renderer 126 to trusted code module 122 by first accessing IMC buffer 206 through the IMC interface, then writing the rendering commands to command buffer 208 and the buffer data to shared memory buffer 210 using the command buffer interface. Similarly, trusted code module 122 may receive the rendering commands and/or buffer data by first accessing IMC buffer 206 through the IMC interface, then reading the rendering commands from command buffer 208 and the buffer data from shared memory buffer 210 using the command buffer interface.

Figure 3:
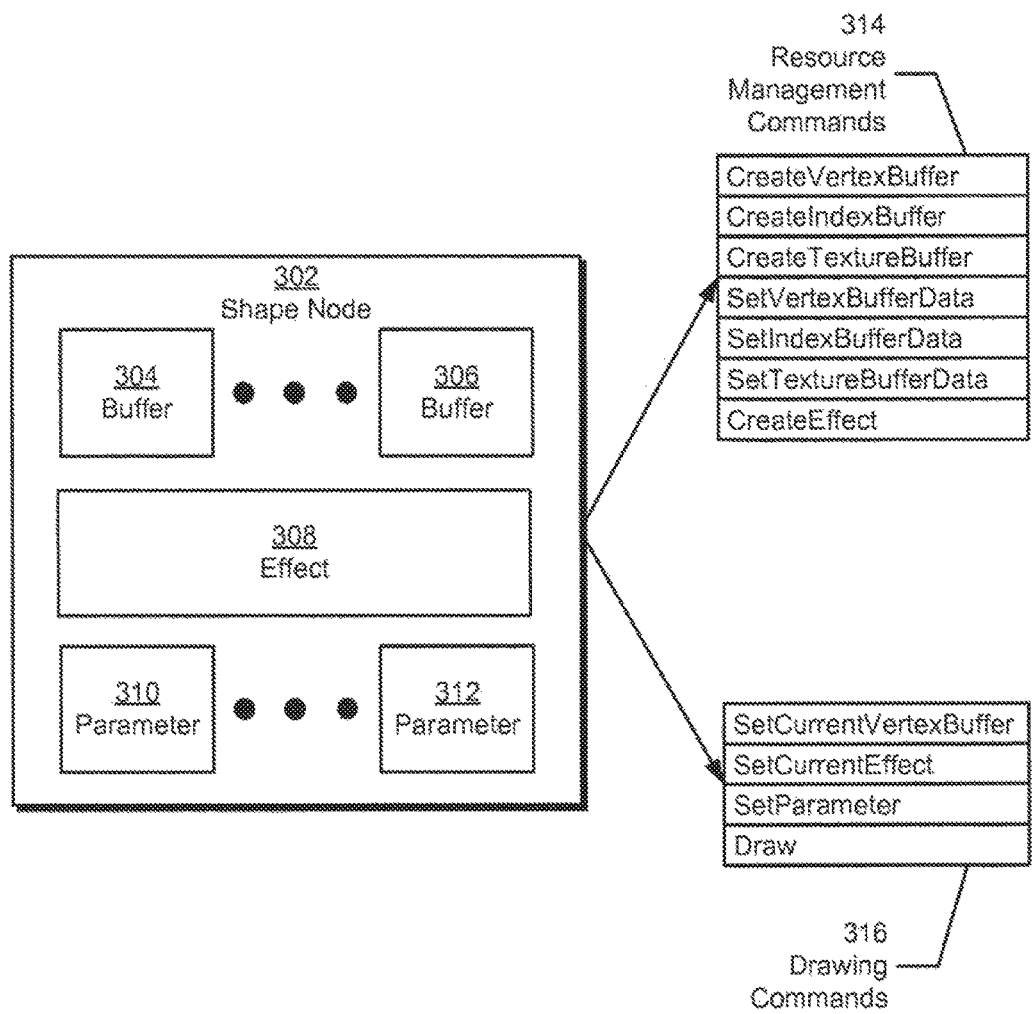
FIG. 3 shows the generation of rendering commands from a shape node in a scenegraph.

FIG. 3 shows the generation of rendering commands from a shape node 302 in a scenegraph. Shape node 302 may correspond to a node that contains data used to render an object in a graphics model. Furthermore, the object may be rendered by traversing shape node 302 within the scenegraph, generating rendering commands from shape node 302, and executing the rendering commands. For example, shape node 302 may be reached in the scenegraph after traversing one or more transform nodes above shape node 302. As a result, shape node 302 may only be rendered after all applicable transforms have been applied and/or other operations (e.g., visibility operations, clipping, culling, etc.) have been performed on the scene graph.

More specifically, shape node 302 includes a set of buffers 304-306 that describe the geometry of the object (e.g., vertices, triangles, etc.) and/or attributes of the objects (e.g., colors, textures, etc.). Shape node 302 also includes an effect 308 that specifies shaders, culling, blending, and/or other settings for a graphics pipeline used to render the objects in the shape node. Finally, shape node 302 includes a set of parameters 310-312 that are used to store values that affect the rendering of the object. Shape node 302 and data associated with shape node 302 are described in further detail in the above-referenced applications.

As mentioned above, shape node 302 may be transformed into a set of rendering commands that are used to render an image corresponding to the graphics model. In particular, shape node 302 may be transformed into a set of resource management commands 314 and a set of drawing commands 316 by a scenegraph renderer (e.g., scenegraph renderer 126 of FIG. 1) provided by a native code module. The scenegraph renderer may then write resource management commands 314 and drawing commands 316 to a command buffer for rendering using a trusted code module (e.g., trusted code module 122 of FIG. 1) and/or a GPU (e.g., GPU 124 of FIG. 1).

Resource management commands 314 may be used by the scenegraph renderer to transmit resource data to the trusted code module through the command buffer interface. Consequently, resource management commands 314 include resource creation commands that create resources for use by the trusted code module. For example, resource management commands 314 may include commands for creating vertex buffers (e.g., "CreateVertexBuffer"), index buffers (e.g., "CreateIndexBuffer"), texture buffers (e.g., "CreateTextureBuffer"), and effects (e.g., "CreateEffect"). Each resource creation command may further specify an identifier (ID) for the resource to be created so that the resource may be subsequently referenced through the command buffer interface.

Resource management commands 314 may also include resource transfer commands that copy data stored within shape node 302 to the resources created from the resource creation commands. For example, resource management commands 314 may include commands for transferring data to vertex buffers (e.g., "SetVertexBufferData"), index buffers (e.g., "SetIndexBufferData"), and texture buffers (e.g., "SetTextureBufferData") for use by the-trusted code module and/or GPU. As with the resource creation commands, each resource transfer command may specify the ID of the resource to which the data is to be transferred. For example, the "SetTextureBufferData" command may reference the ID of the texture buffer created using the "CreateTextureBuffer" command as, well as a shared memory buffer containing the texture buffer data. The trusted code module may then execute the "SetTextureBufferData" command by copying the data in the shared memory buffer to the texture buffer.

In addition, some resource management commands 314 may both create and transfer resources through the command buffer interface. For example, the "CreateEffect" command may include a reference to a shared memory buffer containing source code for effect 308. When the "CreateEffect" command is executed, the source code is transferred to memory accessible by the trusted code module.

Drawing commands 316 may be used by the scenegraph renderer to request rendering of shape mode 302. In particular, drawing commands 316 may set resources used to render shape node 302. For example, drawing commands 316 may include commands for setting a vertex buffer (e.g., "SetCurrentVertexBuffer"), effect (e.g., "SetCurrentEffect"), and parameter (e.g., "SetParameter") used to render shape node 302. Drawing commands 316 may also include a "Draw" command that requests rendering of shape node 302 using the resources set by the other drawing commands. Upon reaching the "Draw" command, the trusted code module may communicate with the GPU to render the object represented by the current vertex buffer, current effect, and/or one or more parameters.

As mentioned previously, rendering commands for shape node 302 may be stored for subsequent use to reduce the amount of computation required to reissue the rendering commands (e.g., to animate shape node 302). As a result, some or all of resource management commands 314 and/or drawing commands 316 may be stored for subsequent rendering of shape node 302 by the trusted code module. In addition, changes to shape node 302 may be propagated to the trusted code module without changing the inherent structure of the rendering commands. For example, shape node 302 may be animated by creating new resources and/or updating existing resources using resource management commands 314 and specifying the new or updated resources using drawing commands 316 prior to redrawing shape node 302. Similarly, shape node 302 may be re-rendered with different effects and/or parameters by executing drawing commands 316 with changes to the parameters of the "SetCurrentEffect" and "SetParameter" commands.

Figure 4:
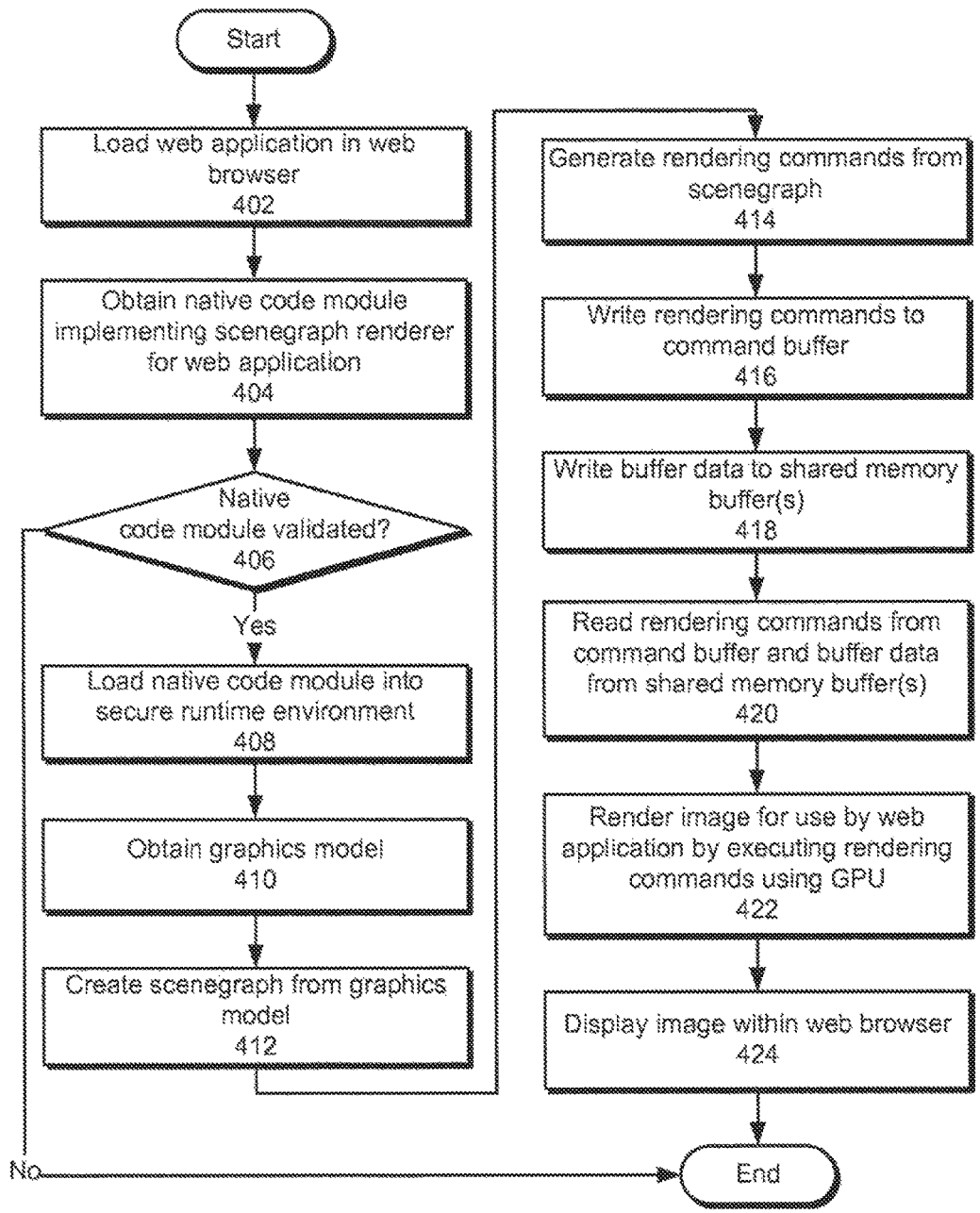
FIG. 4 shows a flowchart illustrating the process of facilitating the execution of a web application.

FIG. 4 shows a flowchart illustrating the process of facilitating the execution of a web application. In one or more embodiments, one or more of the steps may be omitted, repeated, and/or performed in a different order. Accordingly, the specific arrangement of steps shown in FIG. 4 should not be construed as limiting the scope of the technique.

Initially, a web application is loaded into a web browser (operation 402). The web application may be obtained from a server by the web browser. The web application may also utilize graphics hardware acceleration in performing tasks for a user. For example, the web application may be associated with a scenegraph renderer, a graphics library, a game engine, a game, a DCC or CAD tool, a video processing application, and/or an image processing application.

To provide graphics hardware acceleration to the web application, a native code module associated with the web application may be obtained (operation 404). For example, the native code module may be downloaded from a source specified by the web application. The native code module may also be validated (operation 406) prior to executing the native code module. If the native code module is not validated, the native code module is discarded without having been executed.

If the native code module is validated, the native code module is loaded into a secure runtime environment (operation 408). The secure runtime environment may be provided by a plugin associated with the web browser. Within the secure runtime environment, the native code module obtains a graphics model (operation 410) associated with the web application and creates a scenegraph from the graphics model (operation 412). In other words, the native code module may contain a scenegraph renderer that provides high-level retain-mode graphics rendering to the web application.

Next, a set of rendering commands is generated from the scenegraph (operation 414). The rendering commands may correspond to low-level immediate-mode commands used to render an image corresponding to the graphics model. The rendering commands are then written to a command buffer (operation 416) for execution by an independently executing software service (e.g., a trusted code module) outside of the native code module and secure runtime environment. In addition, buffer data is written to one or more shared memory buffers (operation 418) to enable the transfer of data (e.g., vertex data, index data, texture data, effects, etc.) from the native code module to the software service.

The software service may read the rendering commands from the command buffer and the buffer data from the shared memory buffer(s) (operation 420). Next, the software service may use the rendering commands and buffer data to render the image by executing the rendering commands using a GPU (operation 422). In particular, the software service may interface directly with the GPU or access the GPU through a rendering engine such as an OpenGL or Direct3D renderer. Furthermore, the image may be rendered by executing the rendering commands with the buffer data as parameters to the rendering commands. For example, the rendering commands may use the buffer data to specify vertices, indexes, textures, parameters, and/or an effect to be used in rendering the image.

The rendered image is then displayed in the web browser (operation 424) as output for the web application. For example, the rendered image may correspond to an updated view of a CAD model or a new frame of a computer game.

Figure 5:
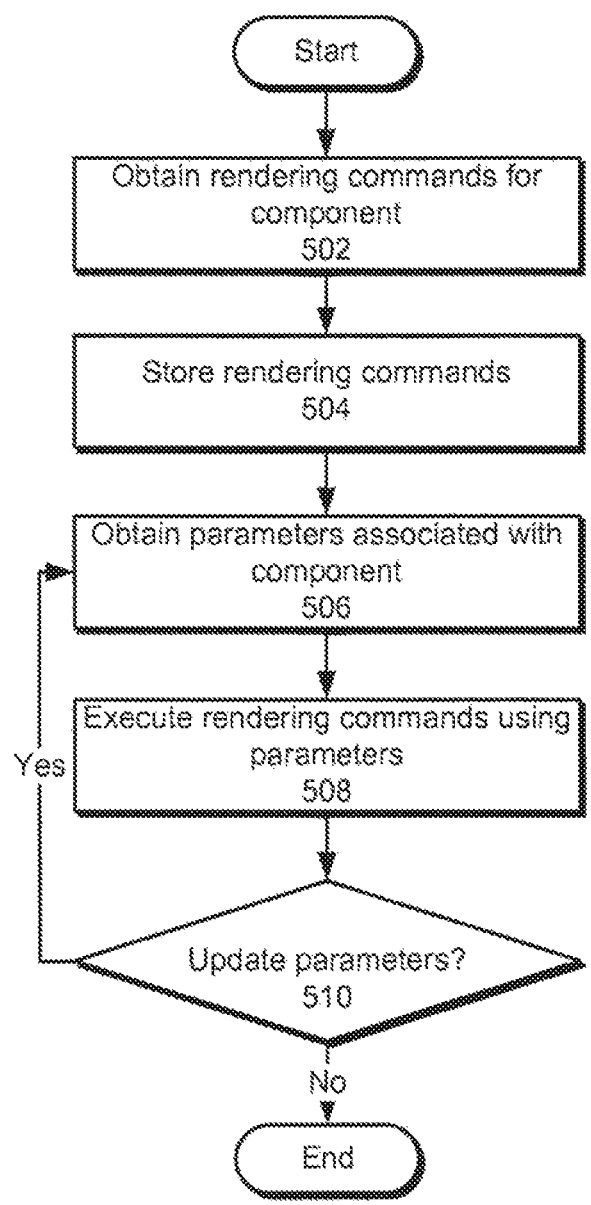
FIG. 5 shows a flowchart illustrating the process of rendering a component in an image.

FIG. 5 shows a flowchart illustrating the process of rendering a component in an image. In one or more embodiments, one or more of the steps may be omitted, repeated, and/or performed in a different order. Accordingly, the specific arrangement of steps shown in FIG. 5 should not be construed as limiting the scope of the technique.

First, rendering commands are obtained for the component (operation 502). The rendering commands may be obtained from a command buffer by a trusted code module for execution of the rendering commands. In addition, the rendering commands may be generated from a shape node in a scenegraph corresponding to the component. The rendering commands are also stored (operation 504). For example, the rendering commands may be stored in memory outside the command buffer for subsequent retrieval and use after the rendering commands are overwritten in the command buffer with new rendering commands.

A set of parameters associated with the component is also obtained (operation 506). For example, the shape node may include parameters that include vertex, index, texture, effect, and/or other data. The parameters may be obtained from the command buffer and/or a shared memory buffer. The rendering commands are then executed using the parameters (operation 508) to render the component in the image.

The parameters may also be updated (operation 510) for subsequent rendering of the component. For example, the parameters may be updated to animate the component in successive frames of the image. If the parameters are updated, the updated parameters are obtained (operation 506), and the stored rendering commands are executed using the updated parameters (operation 508). In other words, the updated parameters may be inserted into the stored command buffer structure associated with the rendering commands in lieu of recalculating the rendering commands with the updated parameters from the command buffer.

The parameters may continue to be updated (operation 510) and obtained (operation 506), and the stored rendering commands executed using the updated parameters (operation 508), until the component is no longer rendered in the image. For example, the stored rendering commands and parameters may be used to render and/or animate a character in a computer game until the character is hidden from view or no longer exists in the computer game.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computer-implemented method, comprising:
executing a native code module in a secure runtime environment, the secure runtime environment preventing the native code module from accessing a graphics rendering interface outside of the secure runtime environment;
generating, using the native code module, rendering commands based on a graphical scene representation; and
transmitting the rendering commands from the native code module within the secure runtime environment to a trusted code module outside the secure runtime environment for execution of the rendering commands by graphics hardware associated with the graphics rendering interface, the trusted code module configured to communicate with the graphics rendering interface to provide graphics acceleration by the graphics hardware.

2. The computer-implemented method of claim 1, wherein transmitting the rendering commands comprises:
writing, using the native code module, the rendering commands to a command buffer shared with the native code module and the trusted code module, and writing image data comprising one or more of vertex data, texture data, and effects data to a data buffer shared with the native code module and the trusted code module.

3. The computer-implemented method of claim 2, further comprising:
generating an animation based on updating parameters in the data buffer for a same set of the rendering commands provided to the command buffer, without regenerating the same set of the rendering commands.

4. The computer-implemented method of claim 1, wherein the graphical scene representation is a scenegraph, the method further comprising:
creating, using the native code module, the scenegraph based on a graphics model comprising a set of shapes, one or more light sources, or one or more rendering effects.

5. The computer-implemented method of claim 4, wherein the scenegraph comprises a shape node, and wherein generating the rendering commands comprises:
transforming the shape node into a set of resource management commands and a set of drawing commands, wherein the resource management commands include commands for creating resources to be used by the trusted code module and for copying data stored in the shape node to the created resources.

6. The computer-implemented method of claim 4, wherein the secure runtime environment is associated with a web application, wherein the graphics model is for the web application, and wherein the graphics acceleration is provided to the web application using the executing, generating, and transmitting steps.

7. The computer-implemented method of claim 6, wherein the web application is associated with a web browser, and wherein a rendered image is generated for display in the web browser using graphics hardware and the rendering commands transmitted from the native code module within the secure runtime environment to a trusted code module outside the secure runtime environment.

8. The computer-implemented method of claim 1, wherein the graphics hardware comprises a graphics-processor unit (GPU) and the graphics rendering interface is an interface of the GPU, and wherein a rendered image is generated for display based on the trusted code module transmitting the rendering commands to the graphics rendering interface for execution using the GPU.

9. The computer-implemented method of claim 1, wherein the graphics rendering interface comprises a low-level rendering application programming interface (API) of a rendering engine not available to the secure runtime environment, and wherein a rendered image is generated for display based on the trusted code module transmitting the rendering commands to the graphics rendering interface for execution using the rendering engine.

10. The computer-implemented method of claim 1, further comprising:
validating native code module before the native code module is loaded into the secure runtime environment; and
loading the native code module in the secure runtime environment after the native code module is validated.

11. The computer-implemented method of claim 1, wherein the native code module comprises binary code that runs directly on hardware.

12. A system, comprising:
one or more processors; and
a memory having instructions stored thereon that, when executed by the one or more processors, perform operations comprising:
executing a native code module in a secure runtime environment, the secure runtime environment preventing the native code module from accessing a graphics rendering interface outside of the secure runtime environment;
generating, using the native code module, rendering commands based on a graphical scene representation; and
transmitting the rendering commands from the native code module within the secure runtime environment to a trusted code module outside the secure runtime environment for execution of the rendering commands outside the secure runtime environment, the trusted code module configured to communicate with the graphics rendering interface to provide graphics acceleration.

13. The system of claim of 12, wherein transmitting the rendering commands comprises:
writing, using the native code module, the rendering commands to a command buffer shared with the native code module and the trusted code module, and writing image data comprising one or more of vertex data, texture data, and effects data to a data buffer shared with the native code module and the trusted code module.

14. The system of claim 13, wherein the operations further comprise:
generating an animation based on updating parameters in the data buffer for a same set of the rendering commands, without regenerating the same set of the rendering commands.

15. The system of claim 12, wherein the graphical scene representation is a scenegraph, the operations further comprising:
creating, using the native code module, the scenegraph based on a graphics model comprising a set of shapes, one or more light sources, or one or more rendering effects.

16. The system of claim 15, wherein the secure runtime environment is associated with a web application, wherein the graphics model is for the web application, and wherein the graphics acceleration is provided to the web application using the executing, generating, and transmitting steps.

17. The system of claim 16, wherein the web application is associated with a web browser, and wherein a rendered image is generated for display in the web browser using graphics hardware and the rendering commands transmitted from the native code module within the secure runtime environment to a trusted code module outside the secure runtime environment.

18. The system of claim 17, wherein the graphics hardware comprises a graphics-processor unit (GPU) and the graphics rendering interface is an interface of the GPU.

19. A non-transitory computer-readable storage medium storing instructions thereon that, when executed by a computer system, cause the computer system to perform a method, comprising:
executing a native code module in a secure runtime environment, the secure runtime environment preventing the native code module from accessing a graphics rendering interface outside of the secure runtime environment;
generating, using the native code module, rendering commands based on a graphical scene representation; and
transmitting the rendering commands from the native code module within the secure runtime environment to a trusted code module outside the secure runtime environment for execution of the rendering commands by graphics hardware associated with the graphics rendering interface, the trusted code module configured to communicate with the graphics rendering interface to provide graphics acceleration by the graphics hardware.

20. The non-transitory computer-readable storage medium of claim 19, wherein the graphical scene representation is a scenegraph, and the secure runtime environment is associated with a web application loaded by a web browser, wherein the method further comprises:
creating, using the native code module, the scenegraph based on a graphics model for the web application, wherein a rendered image is generated for display in the web browser using graphics hardware and the rendering commands transmitted from the native code module within the secure runtime environment to a trusted code module outside the secure runtime environment.

* * * * *